United States Patent
Aida et al.

(10) Patent No.: US 10,894,842 B2
(45) Date of Patent: Jan. 19, 2021

(54) METHOD FOR PRODUCING OLIGOMER AND CATALYST

(71) Applicant: ENEOS Corporation, Tokyo (JP)

(72) Inventors: Fuyuki Aida, Tokyo (JP); Kazuo Tagawa, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 16/325,261

(22) PCT Filed: Aug. 28, 2017

(86) PCT No.: PCT/JP2017/030770
§ 371 (c)(1),
(2) Date: Feb. 13, 2019

(87) PCT Pub. No.: WO2018/043418
PCT Pub. Date: Mar. 8, 2018

(65) Prior Publication Data
US 2019/0185593 A1 Jun. 20, 2019

(30) Foreign Application Priority Data

Aug. 30, 2016 (JP) ................................ 2016-168193

(51) Int. Cl.
| | | |
|---|---|---|
| C08F 4/70 | (2006.01) | |
| C08F 110/02 | (2006.01) | |
| C08F 10/02 | (2006.01) | |
| B01J 31/22 | (2006.01) | |
| C08F 210/16 | (2006.01) | |

(52) U.S. Cl.
CPC ............ *C08F 4/7042* (2013.01); *B01J 31/22* (2013.01); *C08F 10/02* (2013.01); *C08F 210/16* (2013.01); *B01J 2231/20* (2013.01); *B01J 2531/004* (2013.01); *B01J 2531/005* (2013.01); *B01J 2531/0241* (2013.01); *B01J 2531/842* (2013.01); *C08F 110/02* (2013.01)

(58) Field of Classification Search
CPC ................ C08F 10/02; C08F 4/7042
See application file for complete search history.

(56) References Cited

U.S. PATENT DOCUMENTS

| 2008/0194768 A1 | 8/2008 | Adelman et al. |
| 2011/0003948 A1 | 1/2011 | Mihan et al. |

FOREIGN PATENT DOCUMENTS

| CN | 102432415 | 5/2012 |
| JP | 2000-516295 | 12/2000 |
| JP | 2002-302510 | 10/2002 |
| JP | 2007-529616 | 10/2007 |
| JP | 2011-006711 | 1/2011 |
| WO | 98/27124 | 6/1998 |
| WO | 01/017967 | 3/2001 |
| WO | 2005/090425 | 9/2005 |
| WO | 2007/021955 | 2/2007 |
| WO | 2009/080359 | 7/2009 |
| WO | 2016/148214 | 9/2016 |

OTHER PUBLICATIONS

"Macromol. Chem. Phys.", 1996, pp. 3907, vol. 197.
"J. Am. Chem. Soc.", 1995, pp. 6414, vol. 117.
"J. Am. Chem. Soc.", 1998, pp. 7143, vol. 120.
"J. Mol. Cat. A: Chemical", 2002, pp. 155, vol. 179.
"Appl. Cat. A: General", 2011, pp. 25, vol. 403.
"Organometallics", 2009, pp. 3225, vol. 28.
"Science", 2006, pp. 714, vol. 312.
Intenational Search Report in International Patent Application No. PCT/JP2017/030770, dated Oct. 10, 2017.
Intenational Preliminary Report on Patentability in International Patent Application No. PCT/JP2017/030770, dated.

*Primary Examiner* — Caixia Lu
(74) *Attorney, Agent, or Firm* — Greenblum & Bernstein, P.L.C.

(57) ABSTRACT

A method for producing an oligomer, the method comprising a step of oligomerizing a polymerizable monomer comprising an olefin in the presence of a catalyst comprising an iron complex represented by the following Formula (1) and trialkylaluminum:

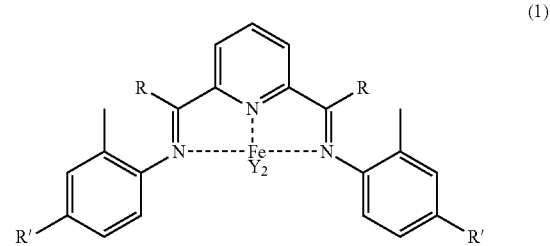

(1)

[In Formula (1), R represents a hydrocarbyl group having 1 to 6 carbon atoms or an aromatic group having 6 to 12 carbon atoms, a plurality of R in the same molecule may be the same or different, R' represents a free radical having an oxygen atom and/or a nitrogen atom, a plurality of R' in the same molecule may be the same or different, and Y represents a chlorine atom or a bromine atom].

6 Claims, No Drawings

METHOD FOR PRODUCING OLIGOMER AND CATALYST

TECHNICAL FIELD

The present invention relates to a catalyst and a production method of an oligomer, and more particularly, to a method for producing an oligomer from a monomer comprising an olefin, and a catalyst therefor.

BACKGROUND ART

As catalysts used in the copolymerization of ethylene and an α-olefin, catalysts consisting of a metallocene compound and methylaluminoxane, palladium-based catalysts, iron complexes and cobalt complexes are known (Non Patent Literatures 1 to 3, Patent Literatures 1 to 3).

Moreover, iron complexes are known as catalysts for ethylene polymerization (Non Patent Literatures 4 to 6).

Moreover, as catalysts to produce block copolymers, catalysts consisting of a metallocene compound, a palladium-based catalyst and dialkyl zinc are known (Non Patent Literature 7, Patent Literature 4).

CITATION LIST

Patent Literature

Patent Literature 1: JP 2000-516295 A
Patent Literature 2: JP 2002-302510 A
Patent Literature 3: CN 102432415 A
Patent Literature 4: JP 2007-529616 A

Non Patent Literature

Non Patent Literature 1: Macromol. Chem. Phys., vol. 197, 1996, p. 3907
Non Patent Literature 2: J. Am. Chem. Soc., vol. 117, 1995, p. 6414
Non Patent Literature 3: J. Am. Chem. Soc., vol. 120, 1998, p. 7143
Non Patent Literature 4: J. Mol. Cat. A: Chemical, vol. 179, 2002, p. 155
Non Patent Literature 5: Appl. Cat. A: General, vol. 403, 2011, p. 25
Non Patent Literature 6: Organometallics, vol. 28, 2009, p. 3225
Non Patent Literature 7: Science, vol. 312, 2006, p. 714

SUMMARY OF INVENTION

Technical Problem

The object of the present invention is to provide a production method of an oligomer, and a catalyst therefor, which can produce an oligomer with a high catalyst efficiency in the oligomerization of a polymerizable monomer comprising an olefin.

Solution to Problem

In other words, the present invention provides a method for producing an oligomer, the method comprising a step of oligomerizing a polymerizable monomer comprising an olefin in the presence of a catalyst comprising an iron complex represented by the following Formula (1) and trialkylaluminum.

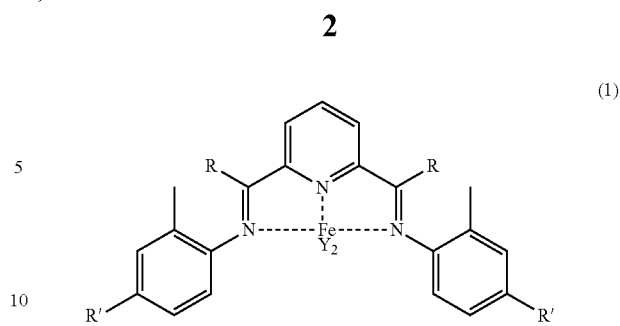

[In Formula (1), R represents a hydrocarbyl group having 1 to 6 carbon atoms or an aromatic group having 6 to 12 carbon atoms, a plurality of R in the same molecule may be the same or different, R' represents a free radical having an oxygen atom and/or a nitrogen atom, a plurality of R' in the same molecule may be the same or different, and Y represents a chlorine atom or a bromine atom.]

In the above method, an oligomer can be produced with a high catalyst efficiency, by oligomerizing a polymerizable monomer comprising an olefin in the presence of the above specific catalyst.

The above trialkylaluminum may comprise trimethylaluminum.

In the above method of the oligomer, the catalyst may further comprise a boron compound, and may further comprise methylaluminoxane.

Moreover, the above catalyst may further comprise a compound represented by the following Formula (2).

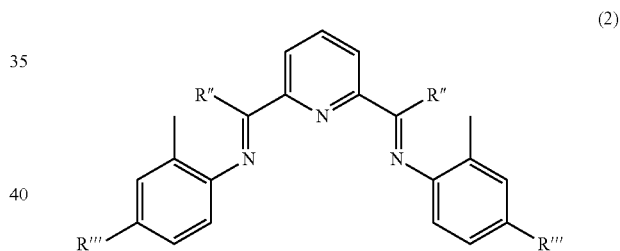

[In Formula (2), R" represents a hydrocarbyl group having 1 to 6 carbon atoms or an aromatic group having 6 to 12 carbon atoms, a plurality of R" in the same molecule may be the same or different, R'" represents a free radical having an oxygen atom and/or a nitrogen atom, and a plurality of R'" in the same molecule may be the same or different.]

The present invention also provides a catalyst comprising an iron complex represented by the following Formula (1) and trialkylaluminum.

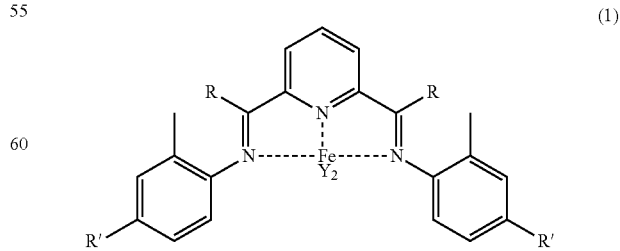

[In Formula (1), R represents a hydrocarbyl group having 1 to 6 carbon atoms or an aromatic group having 6 to 12 carbon atoms, a plurality of R in the same molecule may be the same or different, R' represents a free radical having an oxygen atom and/or a nitrogen atom, a plurality of R' in the same molecule may be the same or different, and Y represents a chlorine atom or a bromine atom.]

Oligomerizing a polymerizable monomer comprising an olefin using the above catalyst allows to produce an oligomer with a high catalyst efficiency.

The catalyst may further comprise a boron compound, and may further comprise methylaluminoxane.

Moreover, the above catalyst may further comprise a compound represented by the following Formula (2).

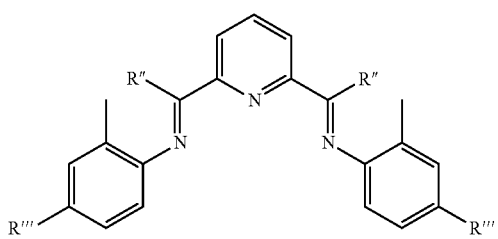

(2)

[In Formula (2), R" represents a hydrocarbyl group having 1 to 6 carbon atoms or an aromatic group having 6 to 12 carbon atoms, a plurality of R" in the same molecule may be the same or different, R'" represents a free radical having an oxygen atom and/or a nitrogen atom, and a plurality of R'" in the same molecule may be the same or different.]

Advantageous Effects of Invention

The present invention can provide a method for producing an oligomer, and a catalyst therefor, which can produce an oligomer with a high catalyst efficiency in the oligomerization of a polymerizable monomer comprising an olefin.

DESCRIPTION OF EMBODIMENTS

Hereinafter, a preferred embodiment of the present invention will be described in detail.

The production method of the oligomer according to this embodiment includes a step of oligomerizing a polymerizable monomer comprising an olefin in the presence of a catalyst. The catalyst for the oligomerization contains an iron complex and trialkylaluminum.

In this embodiment, the iron complex is represented by the following Formula (1).

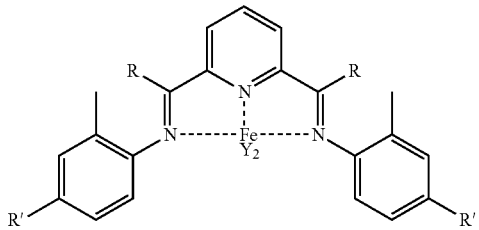

(1)

In Formula (1), R represents a hydrocarbyl group having 1 to 6 carbon atoms or an aromatic group having 6 to 12 carbon atoms, and a plurality of R in the same molecule may be the same or different. R' represents an organic group having an oxygen atom and/or a nitrogen atom, and a plurality of R' in the same molecule may be the same or different. Y represents a chlorine atom or a bromine atom.

Examples of the hydrocarbyl groups having 1 to 6 carbon atoms include alkyl groups having 1 to 6 carbon atoms and alkenyl groups having 2 to 6 carbon atoms. The hydrocarbyl group may be either linear, branched or cyclic. The hydrocarbyl group may also be a monovalent group in which a linear or branched hydrocarbyl group and a cyclic hydrocarbyl group are bonded.

Examples of the alkyl groups having 1 to 6 carbon atoms include linear alkyl groups having 1 to 6 carbon atoms such as a methyl group, an ethyl group, a n-propyl group, a n-butyl group, a n-pentyl group and a n-hexyl group; branched alkyl groups having 3 to 6 carbon atoms such as an iso-propyl group, an iso-butyl group, a sec-butyl group, a tert-butyl group, a branched pentyl group (including all structural isomers), and a branched hexyl group (including all structural isomers); and cyclic alkyl groups having 1 to 6 carbon atoms such as a cyclopropyl group, a cyclobutyl group, a cyclopentyl group, and a cyclohexyl group.

Examples of the alkenyl groups having 2 to 6 carbon atoms include linear alkenyl groups having 2 to 6 carbon atoms such as an ethenyl group (vinyl group), a n-propenyl group, a n-butenyl group, a n-pentenyl group, and a n-hexenyl group; branched alkenyl groups having 2 to 6 carbon atoms such as an iso-propenyl group, an iso-butenyl group, a sec-butenyl group, a tert-butenyl group, a branched pentenyl group (including all structural isomers), and a branched hexenyl group (including all structural isomers); and cyclic alkenyl groups having 2 to 6 carbon atoms such as a cyclopropenyl group, a cyclobutenyl group, a cyclopentenyl group, a cyclopentadienyl group, a cyclohexenyl group, and a cyclohexadienyl group.

Examples of the aromatic groups having 6 to 12 carbon atoms include a phenyl group, a toluyl group, a xylyl group and a naphthyl group.

In Formula (1), a plurality of R in the same molecule may be the same or different, but from a viewpoint of simplifying the synthesis of the compound, they may be the same.

The organic group having an oxygen atom and/or a nitrogen atom may be a free radical having 0 to 6 carbon atoms and having an oxygen atom and/or a nitrogen atom, and examples thereof include a methoxy group, an ethoxy group, an isopropoxy group and a nitro group.

Specific examples of such iron complex include the compounds represented by the following Formulas (1a) to (1h). These iron complexes may be used singly or in combinations of two or more.

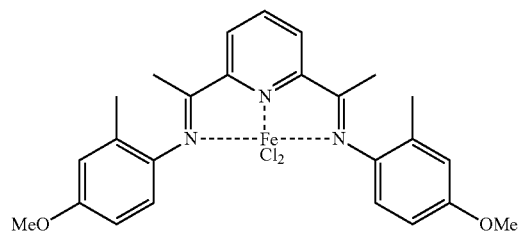

(1a)

-continued

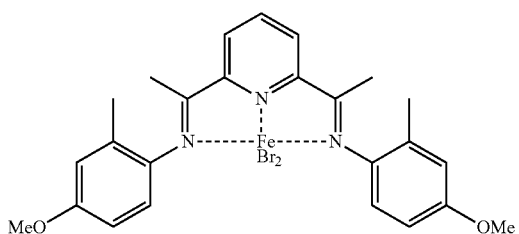
(1b)

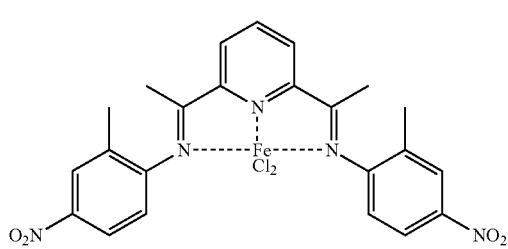
(1c)

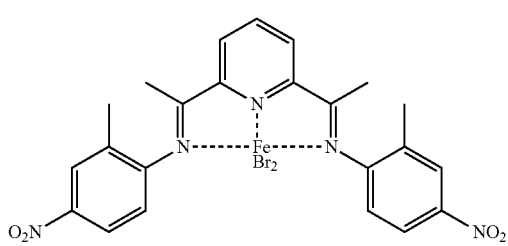
(1d)

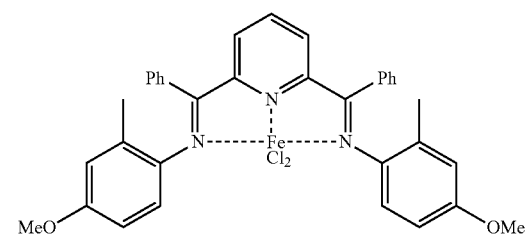
(1e)

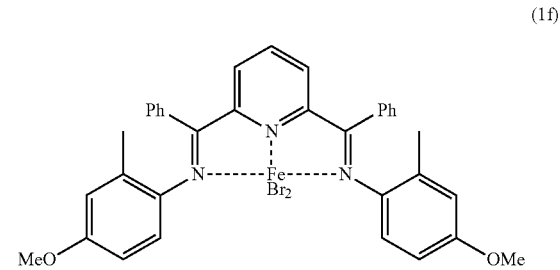
(1f)

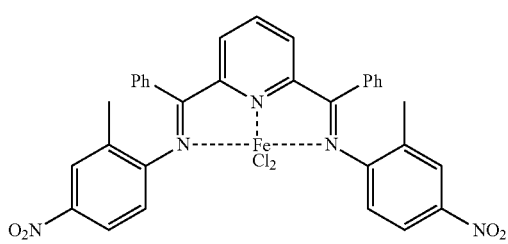
(1g)

-continued

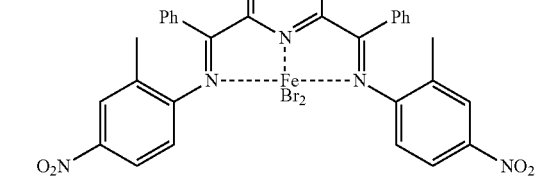
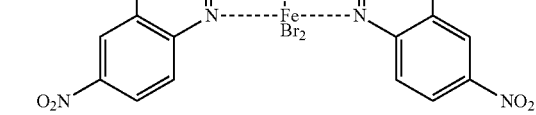
(1h)

In the iron complex represented by Formula (1), the compound constituting the ligand (hereinafter sometimes referred to as a diimine compound) can be synthesized, for example, by dehydration condensation of dibenzoylpyridine and an aniline compound in the presence of an acid.

A preferable aspect of the production method of the above diimine compound includes a first step in which 2,6-dibenzoylpyridine, an aniline compound and an acid are dissolved in a solvent and are subjected to dehydration condensation under heating the solvent to reflux, and a second step in which the reaction mixture after the first step is subjected to separation/purification treatment to obtain the diimine compound.

An example of the acid used in the first step is an organic aluminum compound. Examples of the organic aluminum compounds include trimethylaluminum, triethylaluminum, tripropylaluminum, triisopropylaluminum, tributylaluminum, triisobutylaluminum, trihexylaluminum, trioctylaluminum, diethylaluminum chloride, ethylaluminum dichloride, ethylaluminum sesquichloride and methylaluminoxane.

Besides the above organic aluminum compounds, a protonic acid can also be used as the acid used in the first step. The protonic acid is used as a proton-donating acid catalyst. The protonic acid used is not particularly limited, but it is preferably an organic acid. Examples of such protonic acid include acetic acid, trifluoroacetic acid, methanesulfonic acid, trifluoromethanesulfonic acid and paratoluenesulfonic acid. When these protonic acids are used, it is preferable to remove by-product water using a Dean-Stark water separator or the like. Moreover, it is also possible to perform the reaction in the presence of an adsorbent such as molecular sieves. The amount of the protonic acid added is not particularly limited, but may be the amount of catalyst.

Moreover, examples of the solvent used in the first step include hydrocarbon solvents and alcohol solvents. Examples of the hydrocarbon solvents include hexane, heptane, octane, benzene, toluene, xylene, cyclohexane and methylcyclohexane. Examples of the alcohol solvents include methanol, ethanol and isopropyl alcohol.

The reaction conditions of the first step can be appropriately selected according to the kind and amount of the raw material compound, acid and solvent.

Moreover, the separation/purification treatment in the second step is not particularly limited, but examples thereof include silica gel column chromatography and recrystallization. In particular, when using the above mentioned organic aluminum compound as the acid, it is preferable to mix the reaction solution with a basic aqueous solution and separate and remove the aluminum, followed by purification.

The iron complex in this embodiment contains iron as the central metal. The method for mixing the above diimine compound with iron is not particularly limited, but examples thereof include:

(i) a method in which an iron salt (hereinafter also simply referred to as "salt") is added to and mixed with a solution in which the diimine compound is dissolved, and
(ii) a method in which the diimine compound and the salt are physically mixed without using a solvent.

Moreover, the method for removing the complex from the mixture of the diimine compound and iron is not particularly limited, but examples thereof include:
(a) a method in which the solid is filtered off after a solvent is distilled off when the solvent is used in the mixture,
(b) a method in which the precipitates resulting from the mixture are filtered off,
(c) a method in which a poor solvent is added to the mixture to purify the precipitates and the precipitates are filtered off, and
(d) a method in which the solvent-free mixture is removed as it is.

After that, a washing treatment with a solvent capable of dissolving the unreacted diimine compound, a washing treatment with a solvent capable of dissolving the unreacted iron salt, and a recrystallization treatment using an appropriate solvent or the like may be performed. Examples of the solvents capable of dissolving the diimine compound include anhydrous ether, tetrahydrofuran, benzene, toluene, xylene, cyclohexane and methylcyclohexane. Examples of the solvents capable of dissolving the iron salt include alcohol solvents such as methanol, ethanol and isopropanol, and also tetrahydrofuran and the like.

Examples of the iron salts include iron (II) chloride, iron (III) chloride, iron (II) bromide, iron (III) bromide, iron (II) acetylacetonate, iron (III) acetylacetonate, iron (II) acetate and iron (III) acetate. Of these salts, those having a ligand such as a solvent or water may be used. Among these, the salts of iron (II) are preferable and iron (II) chloride is more preferable.

Moreover, the solvents to which the diimine compound and the iron are brought into contact is not particularly limited, and both nonpolar and polar solvents can be used. Examples of the nonpolar solvents include hydrocarbon solvents such as hexane, heptane, octane, benzene, toluene, xylene, cyclohexane and methylcyclohexane. Examples of the polar solvents include polar protic solvents such as alcohol solvents and polar aprotic solvents such as tetrahydrofuran. Examples of the alcohol solvents include methanol, ethanol and isopropyl alcohol. In particular, when using directly the mixture as the catalyst, it is preferable to use a hydrocarbon solvent that does not substantially impact the olefin polymerization.

Moreover, the mixing ratio of the diimine compound and the iron when bringing them into contact is not particularly limited. The ratio of the diimine compound/iron may be, in molar ratio, 0.2/1 to 5/1, 0.3/1 to 3/1, 0.5/1 to 2/1, or 1/1.

It is preferable that the two imine moieties of the diimine compound are both E-forms, but if a diimine compound with both E-forms is included, a diimine compound including a Z-form may be included. Since it is hard for a diimine compound including a Z-form to form a complex with a metal, it is possible to easily remove it by a purification step such as solvent washing after forming the complex in the system.

In this embodiment, the catalyst for the oligomerization contains trialkylaluminum besides the iron complex represented by the above Formula (1).

The trialkylaluminum may be a trialkylaluminum having an alkyl group having 10 or less carbon atoms, or a trialkylaluminum having an alkyl group having 8 or less carbon atoms. Examples of such trialkylaluminum include trimethylaluminum, triethylaluminum, triisobutylaluminum, tributylaluminum, trihexylaluminum and trioctylaluminum. From a viewpoint of more effectively improving the catalyst efficiency, it is preferable that the trialkylaluminum includes at least one selected from the group consisting of trimethylaluminum, triethylaluminum and triisobutylaluminum, and it is more preferable for the trialkylaluminum to include trimethylaluminum.

The content ratio of the iron complex represented by Formula (1) and the trialkylaluminum may be, in molar ratio, G:H=1:10 to 1:1000, 1:10 to 1:800, or 1:20 to 1:600, with G as the number of moles of the iron complex and H as the number of moles of the trialkylaluminum. Within the above range, it is possible to exhibit a more sufficient catalyst efficiency.

In the present embodiment, the catalyst for the oligomerization can further contain optional components. Examples of the optional components include boron compounds and methylaluminoxane.

Boron compounds function as a promoter which further improves the catalyst activity of the iron complex represented by the above Formula (1) in the olefin polymerization reaction.

Examples of the boron compounds include aryl boron compounds such as tris(pentafluorophenyl)borane. Moreover, boron compounds having an anion species can be used. Examples include aryl borates such as tetrakis(pentafluorophenyl)borate and tetrakis[3,5-(trifluoromethyl)phenyl]borate. Specific examples of the aryl borates include lithium tetrakis(pentafluorophenyl)borate, sodium tetrakis(pentafluorophenyl)borate, N,N-dimethylanilinium tetrakis(pentafluorophenyl)borate, trityl tetrakis(pentafluorophenyl)borate, lithium tetrakis(3,5-trifluoromethylphenyl)borate, sodium tetrakis(3,5-trifluoromethylphenyl)borate, N,N-dimethylanilinium tetrakis(3,5-trifluoromethylphenyl)borate and trityl tetrakis(3,5-trifluoromethylphenyl)borate. Among these, N,N-dimethylanilinium tetrakis(pentafluorophenyl)borate, trityl tetrakis(pentafluorophenyl)borate, N,N-dimethylanilinium tetrakis(3,5-trifluoromethylphenyl)borate and, trityl tetrakis(3,5-trifluoromethylphenyl)borate are preferable. These boron compounds may be used singly or in combinations of two or more.

In the catalyst further containing a boron compound, the content ratio of the trialkylaluminum and the boron compound may be, in molar ratio, H:J=1000:1 to 1:1, 800:1 to 2:1, or 600:1 to 10:1, with H as the number of moles of the trialkylaluminum and J as the number of moles of the boron compound. Within the above range, it is possible to exhibit a more sufficient catalyst efficiency, while suppressing the factors of cost increase.

For methylaluminoxane, the commercially available product diluted with a solvent can be used. Moreover, modified methylaluminoxane obtained by modifying methylaluminoxane by an active proton compound such as phenol or its derivatives may be used.

In the catalyst further containing methylaluminoxane, the content ratio of trialkylaluminum and methylaluminoxane may be, in molar ratio, H:Y=100:1 to 1:100, 50:1 to 1:50, or 10:1 to 1:10, with H as the number of moles of trialkylaluminum and Y as the number of moles of aluminum atoms in methylaluminoxane. Within the above range, it is possible to exhibit a more sufficient catalyst efficiency, while suppressing the factors of cost increase.

The production method of the catalyst according to this embodiment is not particularly limited, and examples thereof include a method in which a solution containing trialkylaluminum is added to and mixed with a solution containing the iron complex represented by the above mentioned Formula (1), and a method in which a solution containing the iron complex represented by Formula (1) is added to and mixed with a solution containing trialkylaluminum. Moreover, when the above mentioned optional components are contained, the iron complex represented by Formula (1), the trialkylaluminum and the optional components may be brought into contact all at once, or may be brought into contact in an arbitrary order. Examples of the production method of the catalyst when it contains optional components include a method in which a solution containing trialkylaluminum is added to and mixed with a solution containing the iron complex represented by Formula (1), and then the resultant is brought into contact with methylaluminoxane, a method in which a solution containing the iron complex represented by Formula (1) is brought into contact with the boron compound, and then a solution containing trialkylaluminum is added and mixed, and a method in which a solution containing the iron complex represented by Formula (1) is brought into contact with the boron compound, and then a solution containing trialkylaluminum is added and mixed, and the resultant is brought into contact with methylaluminoxane.

The catalyst according to this embodiment may further contain the compound represented by the following Formula (2) (hereinafter also referred to as ligand), as needed.

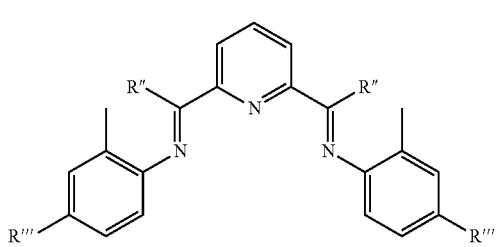

(2)

In Formula (2), R″ represents a hydrocarbyl group having 1 to 6 carbon atoms or an aromatic group having 6 to 12 carbon atoms, a plurality of R″ in the same molecule may be the same or different, R‴ represents a free radical having an oxygen atom and/or a nitrogen atom, a plurality of R‴ in the same molecule may be the same or different.

Further containing such a ligand allows to further improve the catalyst efficiency and to maintain the polymerization activity for a long time. The present inventors assume the reasons as follows why such an effect is obtained by further containing a ligand.

The present inventors have confirmed that, in the step of oligomerizing the polymerizable monomer, when the oligomerization reaction progresses over a long time, the number average molecular weight (Mn) of the obtained polymer increases and the molecular weight distribution (Mw/Mn) sometimes tends to become wider. It is believed that this may be caused by a decrease in the original function of the iron complex represented by Formula (1), due to some structural change having occurred in the iron complex, including a break in the bond between the diimine compound and the iron in the iron complex as the oligomerization reaction progresses.

However, it is believed that, by adding beforehand the ligand to the catalyst, the iron complex before the structural change is reproduced by re-binding of the ligand and the iron in the iron complex during the oligomerization reaction. Therefore, it is believed that, even if the reaction progresses over a long time, the increase in molecular weight of the obtained polymer may be suppressed. The present inventors have also confirmed that, since the iron salt such as iron chloride does not dissolve in the polymerization solvent such as toluene and does not form a complex, a similar effect cannot be obtained by just simply adding the ligand and the iron separately.

Examples of the hydrocarbyl group having 1 to 6 carbon atoms include alkyl groups having 1 to 6 carbon atoms and alkenyl groups having 2 to 6 carbon atoms. The hydrocarbyl group may be either linear, branched or cyclic. The hydrocarbyl group may also be a monovalent group in which a linear or branched hydrocarbyl group and a cyclic hydrocarbyl group are bonded.

Examples of the alkyl groups having 1 to 6 carbon atoms include linear alkyl groups having 1 to 6 carbon atoms such as a methyl group, an ethyl group, a n-propyl group, a n-butyl group, a n-pentyl group and a n-hexyl group; branched alkyl groups having 3 to 6 carbon atoms such as an iso-propyl group, an iso-butyl group, a sec-butyl group, a tert-butyl group, a branched pentyl group (including all structural isomers), and a branched hexyl group (including all structural isomers); and cyclic alkyl groups having 1 to 6 carbon atoms such as a cyclopropyl group, a cyclobutyl group, a cyclopentyl group, and a cyclohexyl group.

Examples of the alkenyl groups having 2 to 6 carbon atoms include linear alkenyl groups having 2 to 6 carbon atoms such as an ethenyl group (vinyl group), a n-propenyl group, a n-butenyl group, a n-pentenyl group, and a n-hexenyl group; branched alkenyl groups having 2 to 6 carbon atoms such as an iso-propenyl group, an iso-butenyl group, a sec-butenyl group, a tert-butenyl group, a branched pentenyl group (including all structural isomers), and a branched hexenyl group (including all structural isomers); and cyclic alkenyl groups having 2 to 6 carbon atoms such as a cyclopropenyl group, a cyclobutenyl group, a cyclopentenyl group, a cyclopentadienyl group, a cyclohexenyl group and a cyclohexadienyl group.

Examples of the aromatic groups having 6 to 12 carbon atoms include a phenyl group, a toluyl group, a xylyl group and a naphthyl group.

In Formula (2), a plurality of R″ in the same molecule may be the same or different, but from a viewpoint of simplifying the synthesis of the compound, they may be the same.

The free radical having an oxygen atom and/or a nitrogen atom may be a free radical having 0 to 6 carbon atoms and having an oxygen atom and/or a nitrogen atom, and examples thereof include a methoxy group, an ethoxy group, an isopropoxy group and a nitro group.

Specific examples of such ligand include the compounds represented by the following Formulas (2a) to (2d). These ligands may be used singly or in combinations of two or more.

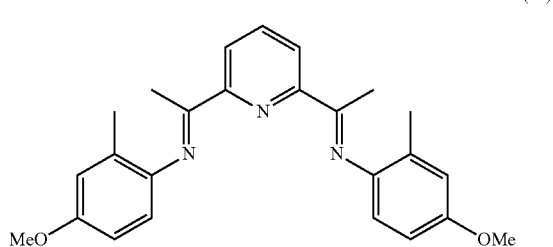

(2a)

-continued

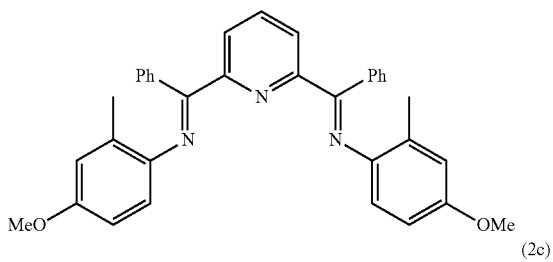
(2b)

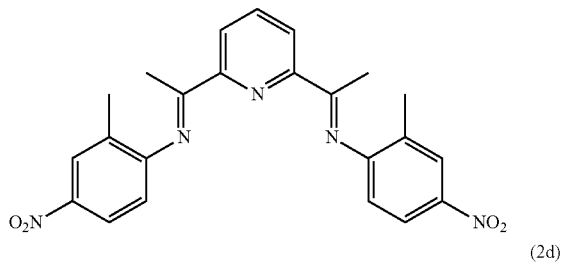
(2c)

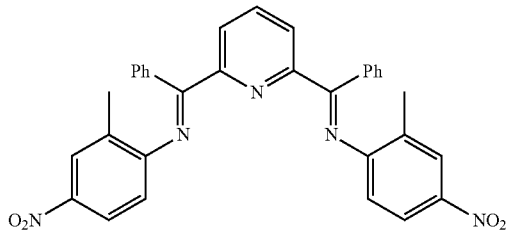
(2d)

Moreover, in the iron complex represented by the above Formula (1) and the compound represented by Formula (2) contained in the catalyst according to this embodiment, the R in Formula (1) and the R″ in Formula (2), and the R′ in Formula (1) and the R‴ in Formula (2) may respectively be the same or different, but from a viewpoint of maintaining a performance similar to that of the iron complex represented by Formula (1), it is preferable that they are the same.

The compound represented by the above Formula (2) can be synthesized by a similar method as the method for the above mentioned diimine compound, and so a redundant description will be omitted here.

In the catalyst according to this embodiment, the content ratio of the iron complex represented by the above Formula (1) and the ligand is not particularly limited. For example, the lower limit of the ligand/iron complex ratio is, in molar ratio, preferably 1/100, more preferably 1/20, further preferably 1/10 and especially preferably 1/5. On the other hand, the upper limit of the ligand/iron complex ratio is, in molar ratio, preferably 100/1, more preferably 50/1, further preferably 10/1, especially preferably 5/1, highly preferably 3/1 and further highly preferably 1/1. If the ligand/iron complex ratio is 1/100 or more, it allows to sufficiently exhibit the addition effect of the ligand, and if it is 100/1 or less, it allows to exhibit the addition effect of the ligand, while suppressing the costs. From such viewpoint, the ligand/iron complex ratio is, for example, 1/100 to 100/1, 1/20 to 50/1, 1/10 to 10/1, 1/5 to 5/1, or 1/5 to 1/1.

In the catalyst according to this embodiment, the order of addition of the compound represented by the above Formula (2), when further contained, is not particularly limited, and examples thereof include a method in which a solution containing trialkylaluminum is added to and mixed with a solution containing the above described iron complex and the ligand, and a method in which a solution containing the ligand is added to and mixed with a solution containing the iron complex and trialkylaluminum.

When further including a ligand in the catalyst according to this embodiment, as described above, the ligand may be added after purifying the iron complex from the reaction mixture of the diimine compound and the iron salt obtained during the synthesis of the iron complex represented by Formula (1), but the diimine compound may also be left present in the catalyst as a ligand, without purifying the iron complex from the reaction mixture, that is, without removing the unreacted amine compound and iron salt. From a viewpoint of further exhibiting the effect obtained by further including ligands, it is preferable to leave the unreacted diimine compound present in the catalyst as a ligand after removing only the unreacted iron salts from the reaction mixture, and it is more preferable to add the ligand after purifying the iron complex represented by Formula (1) from the reaction mixture.

The production method of the oligomer in this embodiment includes a step of oligomerizing a polymerizable monomer comprising an olefin in the presence of the catalyst according to this embodiment described above.

Examples of the olefins include ethylene and α-olefins. Examples of α-olefins include propylene, 1-butene, 1-pentene, 1-hexene, 1-octene, 1-decene, 1-dodecene, but also those having a branch of a methyl group etc. other than at position 2 such as 4-methyl-1-pentene. Among these α-olefins, propylene may be used from a viewpoint of reactivity.

The oligomer obtained by the production method according to this embodiment may be a homopolymer of one of the above olefins, or a copolymer of two or more of the above olefins. Such oligomer may be, for example, a homopolymer of ethylene, a homopolymer of propylene, or a copolymer of ethylene and propylene. Moreover, the oligomer may further contain a structural unit derived from a monomer other than olefins.

When oligomerizing polymerizable monomers comprising ethylene and an α-olefin, the supply ratio of ethylene and an α-olefin to bring into contact with the catalyst is not particularly limited, but may be, in molar ratio, ethylene:α-olefin=1000:1 to 1:1000, or 100:1 to 1:100. Since there are differences in the reactivity between ethylene and α-olefins, the reactivity ratio can be calculated by the Fineman-Ross method and the supply ratio of ethylene and the α-olefin to be supplied can be determined appropriately from the desired composition ratio in the product.

The polymerizable monomers used in this embodiment may consist of ethylene or an α-olefin, or they can further contain monomers other than ethylene or an α-olefin. Moreover, an example of one aspect of the production method according to this embodiment is a method in which the polymerizable monomer is introduced in the reactor filled with the catalyst. The method for introducing the polymerizable monomers to the reactor is not particularly limited, but if the polymerizable monomer is a monomer mixture containing two or more olefins, the monomer mixture may be introduced in the reactor, or each polymerizable monomer may be introduced separately.

Moreover, a solvent may be used during the oligomerization. Examples of the solvents include aliphatic hydrocarbon solvents such as butane, pentane, hexane, heptane, octane, cyclohexane, methylcyclohexane and decalin; and aromatic hydrocarbon solvents such as tetralin, benzene, toluene and xylene. The catalyst can be dissolved in these solvents and solution polymerization, slurry polymerization and the like can be performed. Moreover, it is also possible to perform a bulk polymerization with the polymerizable monomer including olefins as the solvent.

The reaction temperature of the oligomerization is not particularly limited, but from a viewpoint of further improving the catalyst efficiency, it may be, for example, −50° C. to 100° C., −30° C. to 80° C., −20° C. to 70° C., 0° C. to 50° C., 5° C. to 30° C., or 5° C. to 15° C. If the reaction temperature is −50° C. or more, the deposition of the oligomer generated can be suppressed while maintaining more sufficiently the catalyst activity, and if 100° C. or less, the decomposition of the catalyst can be suppressed. Moreover, the reaction pressure is also not particularly limited, but may be, for example, 100 kPa to 5 MPa. The reaction time is also not particularly limited, but may be, for example, 1 minute to 24 hours, 5 minutes to 60 minutes, 10 minutes to 45 minutes, or 20 minutes to 40 minutes.

In this embodiment, "oligomer" means a polymer with a number average molecular weight (Mn) of 10000 or less. The Mn of the oligomer obtained by the production method of an oligomer according to this embodiment above can be adjusted appropriately according to the purpose of use. For example, if using the oligomer as a wax or a lubricating oil, the Mn of the oligomer is preferably 200 to 5000, more preferably 300 to 4000, and further preferably 350 to 3000. Moreover, the dispersion degree is a ratio of the weight-average molecular weight (Mw) to Mn and is expressed as Mw/Mn, but it may be, for example, 1.0 to 5.0 or 1.1 to 3.0. The Mn and Mw of the oligomers can be found, for example, in terms of polystyrene based on the calibration curve formed from standard polystyrene using a GPC device.

The production method according to this embodiment is useful as a production method of base materials for lubricating oils such as olefin oligomer wax or poly-α-olefins (PAO). The oligomers obtained by the production method according to this embodiment can be preferably used as components of, for example, lubricating oil compositions.

EXAMPLES

Hereinafter, the present invention is illustrated by the Examples, but the following Examples are not intended to limit the present invention.

[Preparation of the Materials]

An iron complex was synthesized according to the method shown in the synthesis example described below. The reagents used were purchased articles as they were. For the trimethylaluminum, a trimethylaluminum toluene solution produced by Tokyo Chemical Industry was used as is. For the triisobutylaluminum, triisobutylaluminum produced by Nippon Aluminum Alkyls was used after being diluted with toluene. Trityl tetrakis(pentafluorophenyl)borate produced by Tokyo Chemical Industry was used as is. Bis(cyclopentadienyl)zirconium dichloride produced by Tokyo Chemical Industry was used as is.

For ethylene, high purity liquefied ethylene of Sumitomo Seika was used after drying through a molecular sieve 4A.

For the solvent toluene, dehydrated toluene produced by Aldrich was used as is.

[Measurement of the Number Average Molecular Weight (Mn) and the Weight-Average Molecular Weight (Mw)]

Two columns (produced by Polymer Laboratories, product name: PL gel 10 μm MIXED-B LS) were connected to a high temperature GPC system (produced by Polymer Laboratories, product name: PL-20), and used as a differential refractive index detector. 5 mL of the solvent ortho-dichlorobenzene was added to 5 mg of the sample, and was heated and stirred at 140° C. for approximately 1 hour. The sample dissolved in this way was subjected to measurement with setting the flow rate at 1 mL/min and the temperature of the column oven at 140° C. The conversion of the molecular weight in terms of polystyrene was conducted based on the calibration curve formed from standard polystyrene.

[Calculation of the Catalyst Efficiency]

The catalyst efficiency was calculated by dividing the weight of the obtained oligomer by the number of moles of the catalyst used.

Production Example 1: Synthesis of the Diimine Compound (1)

2-Methyl-4-methoxyanilin (2.0893 g, 15.3 mmol, produced by Tokyo Chemical Industry) and 2,6-diacetylpyridine (1.2429 g, 7.6 mmol, produced by Tokyo Chemical Industry), a molecular sieve 4A (5.0 g) and a catalytic amount of paratoluenesulfonic acid were dispersed in dry toluene (60 mL), and were stirred while removing water and heating under reflux for 24 hours using a Dean-Stark water separator.

The molecular sieve was removed from the reaction solution by filtration, and the molecular sieve was washed with toluene. The washing liquid and the filtered reaction solution was mixed, and the resultant was concentrated to dryness to obtain a crude solid (2.8241 g). The obtained crude solid (2 g) was weighed and washed with anhydrous ethanol (30 mL). The solid insoluble in ethanol was filtered off and this insoluble solid was further washed with ethanol. The residual solid was sufficiently dried to obtain the following diimine compound (I) with a yield of 50%.

$^1$H-NMR (600 MHz, CDCl$_3$): 2.1 (s, 6H), 2.4 (s, 6H), 3.8 (s, 6H), 6.6 (m, 2H), 6.7 (m, 2H), 6.8 (m, 2H), 7.9 (m, 1H), 8.4 (m, 2H)

$^{13}$C NMR (600 MHz, CDCl$_3$): 16, 18, 56, 116, 119, 122, 125, 129, 137, 138, 143, 156, 167

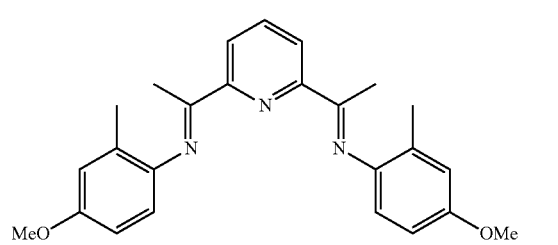

(I)

Production Example 2: Synthesis of the Iron Complex (1a)

FeCl$_2$.4H$_2$O (0.2401 g, 1.2 mmol, produced by Kanto Chemical) was dissolved in dry tetrahydrofuran (30 mL, produced by Aldrich) and a tetrahydrofuran solution (10 mL) of the diimine compound (I) (0.4843 g, 1.2 mmol) was added. By adding the yellow diimine compound, it immediately became a dark green tetrahydrofuran solution. It was then further stirred for 2 hours at room temperature. The solvent was evaporated to dryness from the reaction solution. The resultant solid was continuously washed with dry ethanol until the filtrate became colorless. The washed solid was further washed with dry diethyl ether and the solvent was evaporated to give the iron complex. Since 527.0820 (calculated value: 527.0831) was obtained on the FD-MASS for the obtained iron complex, it suggests the structure of the following iron complex (1a).

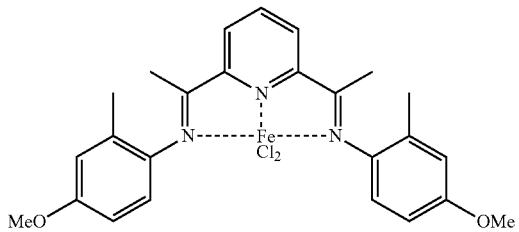

(1a)

Example 1

A 660 mL autoclave with an electromagnetic induction stirrer was sufficiently dried beforehand at 110° C. under reduced pressure. Next, under nitrogen, dry toluene (80 mL) was introduced in the autoclave, and the temperature was adjusted to 10° C.

The iron complex obtained in Production Example 2 (1 μmol) was dissolved in 20 mL of dry toluene in a 50 mL flask and under nitrogen to form a solution (A). A 500 equivalent amount of trimethylaluminum (TMA) solution with respect to the iron complex was added to the solution (A) and the resultant was stirred for 5 minutes to obtain a solution (B) containing the catalyst. The solution (B) was added to the autoclave where dry toluene was introduced, and ethylene at 0.19 MPa was introduced continuously at 10° C. The introduction of ethylene was stopped after 30 minutes, the unreacted ethylene was removed, the ethylene in the autoclave was purged with nitrogen, and a very small amount of ethanol was added. The autoclave was opened, the content was transferred to a 200 mL flask and the solvent was distilled off under reduced pressure to obtain a semi-solid oligomer. The catalyst efficiency (C.E.) was 1479 Poly/Fe mol. Moreover, the Mn of the obtained oligomer was 550 and Mw/Mn was 1.6.

Example 2

Besides setting the temperature of the autoclave to room temperature (25° C.) when continuously introducing ethylene, the same operations as in Example 1 were performed. The catalyst efficiency (C.E.) was 1398 kg Poly/Fe mol. Moreover, the Mn of the obtained oligomer was 370 and Mw/Mn was 1.3.

Example 3

The iron complex obtained in Production Example 2 (1 μmop and trityl tetrakis(pentafluorophenyl)borate (1 μmop was dissolved in 20 mL of dry toluene in a 50 mL flask and under nitrogen to form a solution (A). A 500 equivalent amount of TMA solution with respect to the iron complex was added to the solution (A) and the resultant was stirred for 5 minutes to obtain a solution (B) containing the catalyst. The solution (B) was added to the autoclave where dry toluene was introduced, and ethylene at 0.19 MPa was introduced continuously at 10° C. The introduction of ethylene was stopped after 30 minutes, the unreacted ethylene was removed, the ethylene in the autoclave was purged with nitrogen, and a very small amount of ethanol was added. The autoclave was opened, the content was transferred to a 200 mL flask and the solvent was distilled off under reduced pressure to obtain a semi-solid oligomer. The catalyst efficiency (C.E.) was 3276 kg Poly/Fe mol. Moreover, the Mn of the obtained oligomer was 500 and Mw/Mn was 1.6.

Example 4

Besides adding a 100 equivalent amount of TMA solution with respect to the iron complex in the preparation step of solution (B), the same operations as in Example 3 were performed. The catalyst efficiency (C.E.) was 6455 kg Poly/Fe mol. Moreover, the Mn of the obtained oligomer was 460 and Mw/Mn was 1.6.

Example 5

The iron complex obtained in Production Example 2 (1 μmol) was dissolved in 20 mL of dry toluene in a 50 mL flask and under nitrogen to form a solution (A). A 500 equivalent amount of TMA solution with respect to the iron complex was added to the solution (A), further a 500 equivalent amount based on an aluminum atom of methylaluminoxane (MAO) with respect was added to the iron complex and the resultant was stirred for 5 minutes to obtain a solution (B) containing the catalyst. The solution (B) was added to the autoclave where dry toluene was introduced, and ethylene at 0.19 MPa was introduced continuously at 40° C. The introduction of ethylene was stopped after 30 minutes, the unreacted ethylene was removed, the ethylene in the autoclave was purged with nitrogen, and a very small amount of ethanol was added. The autoclave was opened, the content was transferred to a 200 mL flask and the solvent was distilled off under reduced pressure to obtain a semi-solid oligomer. The catalyst efficiency (C.E.) was 4908 kg Poly/Fe mol. Moreover, the Mn of the obtained oligomer was 420 and Mw/Mn was 1.5.

Example 6

Besides adding a 100 equivalent amount of triisobutylaluminum (TIBA) solution with respect to the iron complex instead of a TMA solution in the preparation step of solution (B), and also setting the temperature of the autoclave to room temperature (25° C.) when continuously introducing ethylene, the same operations as in Example 4 were performed. The catalyst efficiency (C.E.) was 482 kg Poly/Fe mol. Moreover, the Mn of the obtained oligomer was 540 and Mw/Mn was 1.4.

Example 7

A 20 L autoclave with an electromagnetic induction stirrer was sufficiently dried beforehand at 110° C. under reduced pressure. Next, under nitrogen, dry toluene (7.6 L) was introduced in the autoclave, and the temperature was adjusted to 0° C.

The iron complex obtained in Production Example 2 (42.2 mg) and 1 equivalent amount of trityl tetrakis(pentafluorophenyl)borate with respect to the iron complex (73.8 mg) was dissolved in 200 ml, of dry toluene in a 500 mL flask and under nitrogen to form a solution (A). A 100 equivalent amount of trimethylaluminum (TMA) solution with respect to the iron complex was added to the solution (A) and the resultant was stirred for 5 minutes to obtain a solution (B)

containing the catalyst. A solution (C) was obtained by further adding the diimine compound (I) obtained in Production Example 1 in 0.33 equivalent amount with respect to the iron complex, to the solution (B) as a ligand (compound 2(a)). This solution (C) was added to the above autoclave where dry toluene was introduced and ethylene at 0.2 MPa was introduced continuously at 0° C. The introduction of ethylene was stopped after 970 minutes, the unreacted ethylene was removed, the ethylene in the autoclave was purged with nitrogen, and a very small amount of ethanol was added. The autoclave was opened, sequentially the content was transferred to a 20 L evaporator and the solvent was distilled off the solvent under reduced pressure to obtain a semi-solid oligomer. The catalyst efficiency (C.E.) was 68875 Poly/Fe mol. Moreover, the Mn of the obtained oligomer was 550 and Mw/Mn was 1.7.

Example 8

Besides not further adding a ligand to the solution (B) and setting the reaction time to 920 min, the same operations as in Example 7 were performed. The catalyst efficiency (C.E.) was 57838 kg Poly/Fe mol. Moreover, the Mn of the obtained oligomer was 530 and Mw/Mn was 1.6.

Example 9

A 660 mL autoclave with an electromagnetic induction stirrer was sufficiently dried beforehand at 110° C. under reduced pressure. Next, under nitrogen, dry toluene (80 mL) was introduced in the autoclave, and the temperature was adjusted to 10° C.

The iron complex obtained in Production Example 2 (1 μmop and trityl tetrakis(pentafluorophenyl)borate (1 mol), and as the ligand (compound 2(a)), the diimine compound (I) obtained in Production Example 1 in 0.5 equivalent amount with respect to the iron complex were dissolved in 20 mL of dry toluene in a 50 mL flask and under nitrogen to form a solution (A). A 100 equivalent amount of trimethylaluminum (TMA) solution with respect to the iron complex was added to the solution (A) and the resultant was stirred for 5 minutes to obtain a solution (B) containing the catalyst. The solution (B) was added to the autoclave where dry toluene was introduced, and ethylene at 0.19 MPa was introduced continuously at 10° C. The introduction of ethylene was stopped after 60 minutes, the unreacted ethylene was removed, the ethylene in the autoclave was purged with nitrogen, and a very small amount of ethanol was added. The autoclave was opened, the content was transferred to a 200 mL flask and the solvent was distilled off under reduced pressure to obtain a semi-solid oligomer. The catalyst efficiency (C.E.) was 8215 Poly/Fe mol. Moreover, the Mn of the obtained oligomer was 340 and Mw/Mn was 2.2.

Example 10

A 660 mL autoclave with an electromagnetic induction stirrer was sufficiently dried beforehand at 110° C. under reduced pressure. Next, under nitrogen, dry toluene (80 mL) was introduced in the autoclave, and the temperature was adjusted to 10° C.

The iron complex obtained in Production Example 2 (1 μmol) and trityl tetrakis(pentafluorophenyl)borate (1 μmop was dissolved in 20 mL of dry toluene in a 50 mL flask and under nitrogen to form a solution (A). A 100 equivalent amount of trimethylaluminum (TMA) solution with respect to the iron complex was added to the solution (A) and the resultant was stirred for 5 minutes to obtain a solution (B) containing the catalyst. A solution (C) containing the catalyst was obtained by adding the diimine compound (I) obtained in Production Example 1 in 0.5 equivalent amount with respect to the iron complex, to the solution (B) as the ligand (compound 2(a)). The solution (C) was added to the autoclave where dry toluene was introduced, and ethylene at 0.19 MPa was introduced continuously at 10° C. The introduction of ethylene was stopped after 60 min, the unreacted ethylene was removed, the ethylene in the autoclave was purged with nitrogen, and a very small amount of ethanol was added. The autoclave was opened, the content was transferred to a 200 mL flask and the solvent was distilled off under reduced pressure to obtain a semi-solid oligomer. The catalyst efficiency (C.E.) was 10524 Poly/Fe mol. Moreover, the Mn of the obtained oligomer was 300 and Mw/Mn was 2.2.

Comparative Example 1

Besides using bis(cyclopentadienyl) zirconium dichloride (5.1 μmol, $Cp_2ZrCl_2$) instead of the iron complex obtained in Production Example 2 in the step of preparing the solution (A), the same operations as in Example 1 were performed. The catalyst efficiency (C.E.) was 0 kg Poly/Fe mol and a polymer could not be obtained.

The composition of the catalysts, as well as the results of the catalyst efficiency, Mn and Mw/Mn regarding the above Examples 1 to 10 and Comparative Example 1 are shown in Table 1. In Table 1, each value regarding the composition of the catalysts indicates the equivalent number.

TABLE 1

|  |  | Example 1 | Example 2 | Example 3 | Example 4 | Example 5 | Example 6 | Example 7 | Example 8 | Example 9 | Example 10 | Comparative Example 1 |
|---|---|---|---|---|---|---|---|---|---|---|---|---|
| Catalyst | Iron compound (1a) | 1 | 1 | 1 | 1 | 1 | 1 | 1 | 1 | 1 | 1 | — |
|  | Compound (2a) | — | — | — | — | — | — | 0.33 | — | 0.5 | 0.5 | — |
|  | $Cp_2ZrCl_2$ | — | — | — | — | — | — | — | — | — | — | 1 |
|  | TMA | 500 | 500 | 500 | 100 | 500 | — | 100 | 100 | 100 | 100 | 500 |
|  | TIBA | — | — | — | — | — | 100 | — | — | — | — | — |
|  | Boron compound | — | — | 1 | 1 | — | 1 | 1 | 1 | 1 | 1 | — |
|  | MAO | — | — | — | — | 500 | — | — | — | — | — | — |
| Polymerization reaction temperature (° C.) |  | 10 | 25 | 10 | 10 | 40 | 25 | 0 | 0 | 10 | 10 | 10 |
| Polymerization reaction time (minutes) |  | 30 | 30 | 30 | 30 | 30 | 30 | 970 | 920 | 60 | 60 | 30 |
| Catalyst efficiency (C.E.) (kg Poly/Fe mol) |  | 1479 | 1398 | 3276 | 6455 | 4908 | 482 | 68875 | 57838 | 8215 | 10524 | 0 |
| Mn |  | 550 | 370 | 500 | 460 | 420 | 540 | 550 | 530 | 340 | 300 | — |
| Mw/Mn |  | 1.6 | 1.3 | 1.6 | 1.6 | 1.5 | 1.4 | 1.7 | 1.6 | 2.2 | 2.2 | — |

The invention claimed is:

1. A method for producing an oligomer, the method comprising a step of oligomerizing a polymerizable monomer comprising an olefin in the presence of a catalyst comprising an iron complex represented by the following Formula (1) and trialkylaluminum:

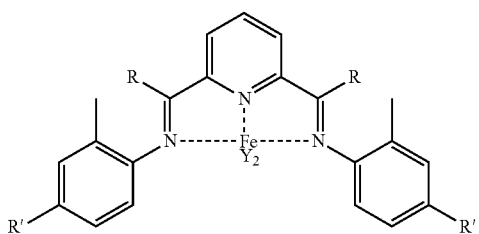
(1)

wherein in Formula (1),
R represents
a hydrocarbyl group having 1 to 6 carbon atoms or
an aromatic group having 6 to 12 carbon atoms,
a plurality of R in the same molecule are the same or different,
R' represents a substituent containing
an oxygen atom and/or
a nitrogen atom,
a plurality of R' in the same molecule are the same or different, and
Y represents a chlorine atom or a bromine atom;
wherein the trialkylaluminum comprises trimethylaluminum; and
wherein the catalyst further comprises a boron compound.

2. The method according to claim 1, wherein the catalyst further comprises a compound represented by the following Formula (2):

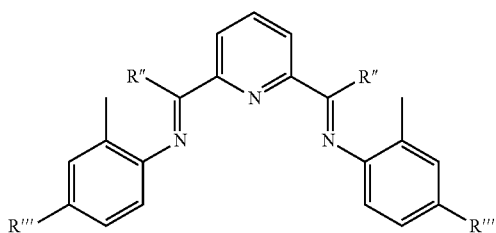
(2)

wherein in Formula (2),
R" represents
a hydrocarbyl group having 1 to 6 carbon atoms or
an aromatic group having 6 to 12 carbon atoms,
a plurality of R" in the same molecule are the same or different,
R'" represents a substituent containing
an oxygen atom and/or
a nitrogen atom, and
a plurality of R'" in the same molecule are the same or different.

3. A catalyst comprising an iron complex represented by the following Formula (1) and trialkylaluminum:

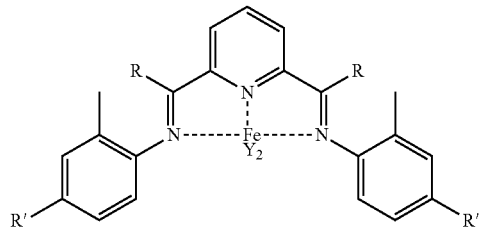
(1)

wherein in Formula (1),
R represents
a hydrocarbyl group having 1 to 6 carbon atoms or
an aromatic group having 6 to 12 carbon atoms,
a plurality of R in the same molecule are the same or different,
R' represents a substituent containing
an oxygen atom and/or
a nitrogen atom,
a plurality of R' in the same molecule are the same or different, and
Y represents a chlorine atom or a bromine atom;
wherein the trialkylaluminum comprises trimethylaluminum; and
wherein the catalyst further comprises a boron compound.

4. The catalyst according to claim 3, further comprising a compound represented by the following Formula (2):

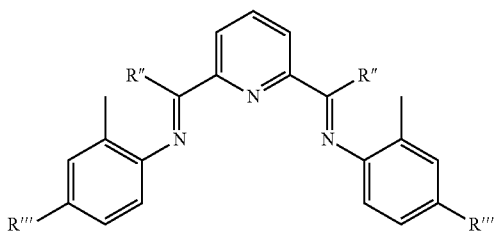
(2)

wherein in Formula (2),
R" represents
a hydrocarbyl group having 1 to 6 carbon atoms or
an aromatic group having 6 to 12 carbon atoms,
a plurality of R" in the same molecule are the same or different,
R'" represents a substituent containing
an oxygen atom and/or
a nitrogen atom, and
a plurality of R'" in the same molecule are the same or different.

5. The method of claim 1,
wherein a molar content ratio of the trialkylaluminum to the boron compound is H:J=1000:1 to 1:1, wherein H represents the number of moles of the trialkylaluminum and J represents the number of moles of the boron compound.

6. The catalyst of claim 3,
wherein a molar content ratio of the trialkylaluminum to the boron compound is H:J=1000:1 to 1:1, wherein H represents the number of moles of the trialkylaluminum and J represents the number of moles of the boron compound.

* * * * *